Aug. 17, 1965    G. RÜMELIN    3,200,911
HYDRAULIC CYLINDER ASSEMBLY FOR DISC BRAKES
Filed Nov. 15, 1961

INVENTOR
Gottfried Rümelin

BY
Stevens, Davis, Miller & Mosher
ATTORNEYS

United States Patent Office 3,200,911
Patented Aug. 17, 1965

3,200,911
HYDRAULIC CYLINDER ASSEMBLY FOR DISC BRAKES
Gottfried Rümelin, Frankfurt am Main-Goldstein, Germany, assignor to Alfred Teves Maschinen- und Armaturenfabrik KG, Frankfurt am Main, Germany
Filed Nov. 15, 1961, Ser. No. 152,523
Claims priority, application Germany, Nov. 16, 1960,
T 19,283
1 Claim. (Cl. 188—196)

This invention relates in general to new and useful improvements in vehicle brakes, and more particularly to improvements in hydraulic disc brakes.

The usual hydraulic disc brakes for vehicles include a rotating disc secured to a wheel of the vehicle, a pair of brake linings disposed on opposite sides of the rotating disc for engagement therewith, and individual wheel cylinders associated with the brake linings for thrusting the brake linings against the rotating disc to effect the stopping or braking of the vehicle wheel. It is desired that the brake linings be disposed closely adjacent to, but spaced from the rotating disc when the vehicle wheel brakes are inoperative in order to hold the necessary movement of the brake linings to a minimum during the actuation of the wheel brakes. However, due to distortions both in the rotating disc and the brake linings, it is normally necessary that this spacing be maintained greater than would normally be necessary. Also, if the axle bearings for the individual wheel has excessive play, the wheel, together with the rotating disc carried thereby, will wobble, particularly in the negotiation of curves.

In the past, it has been proposed to solve the problem of excess clearance requirement by interconnecting the working chambers of the two wheel brake cylinders of each wheel brake by a hydraulic line so as to throttle the supply from the master cylinder to the wheel brake cylinders so that hydraulic fluid displaced from one wheel cylinder passes to the other wheel cylinder of the pair. In this manner, the necessary clearance provided between the two brake linings is divided, as is necessary, on opposite sides of the rotating disc. However, this arrangement is impaired by piston friction and by the throttling of the hydraulic fluid in the hydraulic fluid piping. As a result, brake clearances may increase and the movement of the brake pedal for actuating the master brake cylinder likewise increases.

In view of the foregoing, it is the primary object of this invention to provide an automatic adjuster for vehicle wheel brake cylinders of disc type brakes wherein the desired brake clearance is automatically restored after one of the pistons of one of the pair of wheel brake cylinders has been thrust into its respective cylinder due to either excessive bearing play or distortion of either the rotating disc or the brake linings.

In accordance with the invention, it is proposed to always restore the brake clearance between a rotating disc and the two brake linings when one of the pistons has been thrust into its cylinder. To this end, in accordance with this invention, each wheel brake cylinder is provided with an adjuster which includes a spring acting upon an abutment movable with respect to the piston whereby inward movement of the piston into its respective cylinder beyond a desired normal position is resisted by the spring and when the pressure urging the piston inwardly is removed, the spring will act to automatically remove the piston to its normal position.

In the past, an adjuster of the broad type of this invention has been constructed. However, in this type of adjuster, the force of the spring disengages the brake lining from the rotating disc by an amount corresponding to the required brake clearance when the hydraulic pressure within the wheel brake cylinder ceases. However, this type of adjuster cannot prevent further entry of the piston into its respective cylinder because of deformation of the disc, excessive bearing play or the like.

Another object of this invention is to provide each vehicle wheel brake cylinder of a disc type brake with a return assembly including a spring which resists movement of a piston into its associated cylinder beyond a predetermined normal position, and which, when the moving force on the piston is removed, will overcome the friction between the piston and its associated cylinder to return the piston to its normal position.

With the above and other objects in view that will hereinafter appear, the nature of the invention will be more clearly understood by reference to the following detailed description, the appended claims and the several views illustrated in the accompanying drawings.

Figure 1:
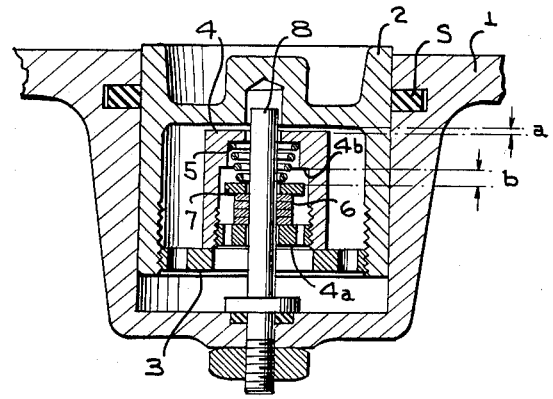
FIGURE 1 is a horizontal sectional view taken through a first form of vehicle wheel cylinder embodying the spirit of this invention.

Referring now to the drawing in detail, it will be seen that the vehicle wheel brake cylinder includes a cylinder 1 of a disc brake having a piston 2 slidably disposed in the bore thereof. The piston 2 is sealed with respect to the cylinder 1 by means of a seal S carried by the cylinder 1.

The piston 2 is of a hollow construction and has a spring abutment 4 disposed therein for abutment with that end of the piston which opposes the brake lining (not shown) of the particular vehicle wheel brake. The opposite end of the cylinder 2 is closed by an end 3 which is adjustably threadedly secured in the inner end of the piston 2 in opposition to an end wall of the cylinder 1. A coil compression spring 5 is disposed generally within the spring abutment 4, which is hollow, and abuts against the spring abutment 4. A locking element 6 is disposed within the spring abutment 4 and has bearing thereagainst a stop ring 7 against which the inner end of the spring 5 abuts. The locking element 6 is carried by a locking pin 8 which is rigidly secured to the end wall of the cylinder 1 and which projects into the piston 2 and through the spring abutment 4. It is to be noted that the spring abutment 4 has the inner end thereof closed by means of an adjustably mounted end 4a which abuts against the locking element 6 and limits the outward movement of the spring abutment 4 due to the urging of the spring 5. The piston 2 has an inner abutment shoulder 4b which opposes the stop ring and is spaced therefrom by a distance b.

At this time, it is pointed out that the locking element 6, which may be of any conventional type, is movable outwardly on the locking pin 8 a distance equal to the stroke of the piston 2 in its movement to urge an associated brake lining into engagement with the rotating disc of the particular vehicle wheel brake. While the brake is thus applied, the piston 2 assumes the outwardly extended position shown in FIGURE 1. At this time, there is a spacing a between the opposed surfaces of the outer end of the piston 2 and the spring abutment 4. This spacing a is determined by the adjustment of the end 3 of the piston 2, the end 3 abutting against the inner end of the spring abutment 4. After the pressure within the cylinder 1 and behind the piston 2 is relieved at the end of a braking operation, the piston 2 is urged into the cylinder 1 by the force exerted on the associated brake lining by the associated rotating disc. This force occurs, in particular, by an axial displacement of the brake disc with respect to the brake housing, when the vehicle negotiates a curve, due to the play of the axle bearings. Thus, when a disc wobbling occurs, then the disc moves the piston 2 back into the cylinder 1. The piston 2 will normally be driven into the cylinder 1 a distance corresponding to the distance $a$ which is the desired clearance between the brake lining and the rotating disc and finally abuts with its inner front surface on the front surface of the spring abutment member 4. This position of the piston 2 with respect to the cylinder is called the normal position. It is readily seen that in this position the distance $a$ occurs between end 3 and the spring abutment 4. However, when for any one of the reasons set forth above, in case of a large play of the axial bearings, for example, the piston 2 is driven into the cylinder 1 further, the piston 2 will move the spring abutment 4 inwardly and the spring 5 will be compressed. Thus, the end 4a, screwed into the spring abutment 4, is removed from the locking element 6. The spring 5 can be compressed at a distance corresponding to the distance $b$, wherein the abutment 4b of the spring abutment 4 abuts on the surface of the stop ring 7, preventing inward movement of the piston 2. This position is called the retracted position. It is to be understood that the gap corresponding to the distance $a$ is maintained between the end 3 and the spring abutment 4. As soon as the inward moving force on the piston 2 is removed, the spring 5, which is sufficient to overcome the frictional forces between the piston 2 and the cylinder 1, will force the spring abutment 4 and the piston 2 outwardly to its normal position, thus restoring the desired brake clearance $a$. It is to be understood that the associated brake lining will then remain spaced from the rotating disc a distance equal to the distance $a$.

Figure 2:
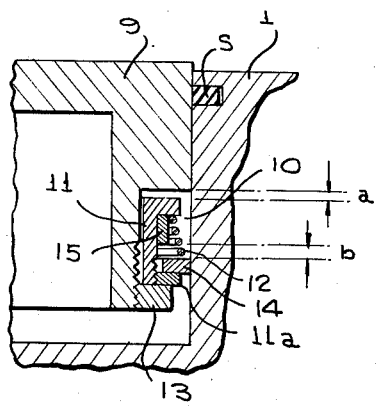
FIGURE 2 is a fragmentary horizontal sectional view through a modified form of vehicle wheel cylinder incorporating another form of this invention.

Reference is now made to FIGURE 2 in particular, wherein a slightly modified form of wheel brake cylinder is illustrated. The cylinder will include the cylinder 1 in which a piston 9 is mounted for sealed relative movement, the piston 9 being sealed with respect to the cylinder 1 by a seal S. The piston 9, like the piston 2, is of a hollow construction, but the rear end thereof is open. On the other hand, the rear portion of the piston 9 is provided with an external groove 10 and the walls of the piston 9 are relatively thick as compared to the walls of the piston 2.

A generally L-shaped cross-sectional annular spring abutment 11 is mounted within the groove 10 for limited axial movement. A compression spring 12 surrounds the spring abutment 11 and has the outer end thereof in abutting engagement with the spring abutment 11. The opposite end of the compression spring 12 bears against a friction ring 14 which tightly frictionally engages the wall of the cylinder 1 and is anchored thereby for limited sliding movement.

The rear part of the piston 9 is provided with an adjustable ring 13 which is threadedly engaged on the piston 9 and forms a rear wall of the groove 10. The spring abutment 11 has a stop ring 11a which is adjustably threaded thereon. The abutment ring 11a abuts against the friction ring 14 and normally limits the outward movement of the spring abutment 11. In a like manner, the adjusting ring 13 abuts against the inner end of the spring abutment 11 and limits the outward movement of the piston 9. It will be apparent that the adjustment of the adjusting ring 13 will control the normal spacing $a$ between the outer end of the spring abutment 11 and an opposed portion of the piston 9.

The spring abutment 11 carries a stop ring 15 which is normally spaced outwardly of the friction ring 14 and which is engageable with the friction ring 11a to restrict the inward movement of the piston 9 by restricting the inward movement of the spring abutment 11. The stop ring 15 is normally spaced from the friction ring 14 by a distance $b$ which may be adjusted by adjusting the position of the ring 11a with respect to the spring abutment 11.

The vehicle wheel brake cylinder of FIGURE 2 operates generally in the same manner as that described above with respect to the vehicle wheel brake cylinder of FIGURE 1. The piston 9 is shown in its outwardly extended position wherein it would be bearing against a brake lining (not shown) to hold such brake lining against the rotating disc (not shown). When the fluid pressure on the piston 9 urging the piston 9 out of the cylinder 1 is relieved, the rotating disc will drive the brake linings away from the same and urge the piston 9 of each vehicle wheel cylinder back into its respective cylinder 1. The piston 9 is free to move into its respective cylinder 1 a distance equal to the distance $a$ until it strikes the spring abutment 11. Further rearward movement of the piston 9 will result in the rearward movement of the spring abutment 11 and the resultant compressing of the spring 12. The spring 12 is of sufficient strength to overcome the friction between the piston 9 and the cylinder 1, and as a result, when the inwardly directed force on the piston 9 is removed, the spring 12 will act to move the spring abutment 11 and the piston 9 outwardly to the normal positions thereof. At this time, the piston 9 will have a position providing a spacing between the associated brake lining and the rotating disc equal to the distance $a$.

From the foregoing, it will be seen that there has been devised an extremely simple adjuster for vehicle wheel brake cylinders, particularly those which are used in conjunction with a disc brake. Further, it will be apparent that the adjuster may be readily incorporated in present types of vehicle wheel brake cylinder designs without materially changing the particular vehicle wheel brake cylinder construction. Although two embodiments of the invention have been illustrated and described, it is to be understood that other minor modifications may be made in the invention within the spirit and scope of the invention, as defined by the appended claim.

What is claimed as new:

An hydraulic cylinder assembly with an automatic adjustment device for disc brakes and the like comprising a cylinder, a sealed piston slidably disposed in said cylinder and having a recess therein, a friction element within the cylinder, an abutment assembly located in the piston recess and disposed for movement with the piston in a brake-applying direction while permitting movement of the piston relative thereto in the opposite direction by an amount corresponding to the desired brake clearance, spring means interposed between the friction element and said abutment assembly for urging the abutment assembly into engagement with the friction element, said spring being disposed to oppose movement of the abutment assembly in the brake release direction.

References Cited by the Examiner
UNITED STATES PATENTS

| | | | |
|---|---|---|---|
| 2,531,341 | 11/50 | Meador | 188—72 |
| 2,746,254 | 5/56 | Lucien | 188—152.873 X |
| 2,866,526 | 12/58 | Wiseman | 188—152.873 X |
| 2,900,052 | 8/59 | Frayer et al. | 188—152.873 X |
| 2,926,757 | 3/60 | Armstrong | 188—152.873 X |

ARTHUR L. LA POINT, *Primary Examiner.*

A. JOSEPH GOLDBERG, *Examiner.*